(12) United States Patent
de Man et al.

(10) Patent No.: US 12,075,793 B2
(45) Date of Patent: Sep. 3, 2024

(54) PROCESS FOR PREPARING FAT CONTINUOUS EMULSIONS

(71) Applicant: UPFIELD EUROPE B.V., Rotterdam (NL)

(72) Inventors: Teunis de Man, Maassluis (NL); Frederik Michiel Meeuse, The Hague (NL)

(73) Assignee: UPFIELD EUROPE B.V., Rotterdam (NL)

( * ) Notice: Subject to any disclaimer, the term of this patent is extended or adjusted under 35 U.S.C. 154(b) by 1458 days.

(21) Appl. No.: 15/776,523

(22) PCT Filed: Nov. 8, 2016

(86) PCT No.: PCT/EP2016/076919
§ 371 (c)(1),
(2) Date: May 16, 2018

(87) PCT Pub. No.: WO2017/084909
PCT Pub. Date: May 26, 2017

(65) Prior Publication Data
US 2018/0332868 A1 Nov. 22, 2018

(30) Foreign Application Priority Data
Nov. 20, 2015 (EP) .................................... 15195612

(51) Int. Cl.
| A23D 7/00 | (2006.01) |
| A23D 7/02 | (2006.01) |
| A23D 7/04 | (2006.01) |
| A23D 7/05 | (2006.01) |

(52) U.S. Cl.
CPC ............... *A23D 7/001* (2013.01); *A23D 7/02* (2013.01); *A23D 7/04* (2013.01); *A23D 7/05* (2013.01)

(58) Field of Classification Search
CPC . A23D 7/04; A23D 7/001; A23D 7/05; A23D 7/02
See application file for complete search history.

(56) References Cited

U.S. PATENT DOCUMENTS

| 3,472,661 A | 10/1969 | Melnick et al. |
| 6,322,843 B1 | 11/2001 | Schuurman et al. |
| 2003/0161935 A1 | 8/2003 | Kakuda et al. |
| 2013/0323395 A1* | 12/2013 | Bons ...................... A23D 7/013 426/604 |
| 2015/0327565 A1 | 11/2015 | Aldred et al. |

FOREIGN PATENT DOCUMENTS

| EP | 2606753 | 6/2013 |
| EP | 2654443 | 1/2016 |
| GB | 1327511 | 8/1973 |
| WO | WO2005014158 | 2/2005 |
| WO | WO2014005797 | 1/2014 |
| WO | WO2014117883 | 8/2014 |
| WO | WO2015052037 | 4/2015 |

OTHER PUBLICATIONS

Co-pending Application: Applicant: de Man et al., Filed: May 16, 2018.
Co-pending Application: Applicant: Lagerwaard et al., Filed: May 16, 2018.
Search Report & Written Opinion in EP15195612 dated Feb. 24, 2016; pp. 1 to 9.
RBD Coconut Oil; Elburg Global Technical Specifications; 2008; pp. 1-2; http://www. elburgglobal.nl, Apr. 4, 2015; XP055249893. pp. 10 to 11.
Search Report & Written Opinion in EP15195609 dated Feb. 24, 2016; pp. 12 to 18.
Search Report and Written Opinion in EP15195607 dated May 17, 2016; pp. 19 to 22.
Search Report and Written Opinion in PCTEP2016076921 dated Dec. 16, 2016; pp. 1 to 9.
Search Report and Written Opinion in PCTEP2016076573 dated Dec. 16, 2016; pp. 10 to 20.
Search Report and Written Opinion in PCTEP2016076919 dated Jan. 19, 2017; pp. 21 to 36.
Search Report and Written Opinion in PCTEP2016076915 dated Jan. 19, 2017; pp. 37 to 49.
Written Opinion 2 in PCTEP2016076915 dated Oct. 5, 2017; pp. 1 to 7.
IPRP2 in PCTEP2016076915 dated Mar. 5, 2018; pp. 8 to 20.
IPRP2 in PCTEP2016076919 dated Feb. 20, 2015; pp. 21 to 41.
Search Report and Written Opinion in EP15195619 dated May 3, 2016; pp. 42 to 46.
Written Opinion 2 in PCTEP2016076919 dated Oct. 13, 2017; pp. 47 to 53.

\* cited by examiner

Primary Examiner — Donald R Spamer
Assistant Examiner — Assaf Zilbering
(74) Attorney, Agent, or Firm — ARENTFOX SCHIFF LLP

(57) ABSTRACT

A process for preparing a water-in-oil emulsion which emulsion comprises oil and a hardstock fraction next to an aqueous phase. The process involves blending the melted hardstock fraction with a water-continuous dispersion comprising part or all of the oil and part or all of the aqueous phase and with a fat-continuous dispersion comprising the remainder of the oil and the remainder of the aqueous phase. The combined stream is mixed by a high shear mixer with short residence time.

15 Claims, No Drawings

PROCESS FOR PREPARING FAT CONTINUOUS EMULSIONS

FIELD OF INVENTION

The present invention relates to a process for preparing fat-continuous emulsions (such as e.g. spreads and margarines) which emulsions comprise fat components like oil and hardstock fat (also known as structuring fat, or simply: "hardstock") and a dispersed aqueous phase. The process easily allows reworking of any waste streams from spreads production.

BACKGROUND OF INVENTION

Edible water-in-oil emulsions, which comprise a continuous fat phase and a dispersed aqueous phase, are well known in the art and include for example margarine.

The fat phase of margarine and similar water-in-oil emulsions is typically a mixture of liquid oil (i.e. fat that is liquid at ambient temperature) and fat which is solid at ambient temperatures. The solid fat, also called structuring fat or hardstock fat, serves to structure the fat phase and helps to stabilize the aqueous phase (e.g. in the form of droplets) by forming a fat crystal network. Ideally the structuring fat has such properties that it melts or dissolves at mouth temperature otherwise the product may have a heavy and/or waxy mouthfeel.

Margarine is generally defined as a composition containing at least 80 wt. % fat and about 20 wt. % aqueous phase. In contrast, (spreadable) emulsions containing less than 80 wt. % fat are generally called spreads. Nowadays the terms margarine and spread are sometimes used interchangeably although in some countries the commercial use of the term margarine is subject to certain regulatory requirements.

In the market place margarine is generally sold as one of three principal types of water-in-oil emulsion:
  hard or stick margarine (also referred to as wrappers);
  (typically softer) tub margarine (typically named "spreads)"; and
  liquid or pourable margarine.

Wrapper margarines and tub margarines are non-pourable and generally contain a higher amount of hardstock fat than liquid or pourable margarines.

The general process for the manufacture of water-in-oil emulsions, using the votator or churn process, encompasses the following steps:
  1. Mixing of the liquid oil, the hardstock fat and the water-phase at a temperature at which the hardstock fat is definitely liquid;
  2. cooling of the mixture under high shear to induce crystallization of the hardstock fat to create an emulsion;
  3. formation of a fat crystal network to stabilize the resulting emulsion and give the product some degree of firmness;
  4. modification of the crystal network to produce the desired firmness, confer plasticity and reduce the water droplet size.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158. A disadvantage of such process is that it requires heating up and cooling the whole formulation, e.g. including all oil and all water. This costs a lot of energy.

An alternative to the votator or churn process for the manufacture of margarines which is known involves the use of fat powder comprising hardstock fat (i.e. pre-crystallized fat) (WO 2005/014158). The fat powder used in such process is also known as ScMM powder (super critical melt micronisation) or PGSS process (particles from gas saturated solutions). Spreads can be made by blending at ambient or colder temperature liquid oil, the fat powder and an aqueous phase. This overcomes having to heat and cool the entire formulation and thus reduces energy consumption when compared to the votator process. Disadvantages of such process relate e.g. to the need for equipment which is new in margarine and spreads making (pressurizing and handling $CO_2$, spraying melted fat, handling fat powder) and capital expenditure. Also, reworking of finished product which cannot be packaged is possible, but not straightforward.

An easy possibility for reworking is desired in any margarine or spreads manufacturing, as packaging lines are prone to breakdown. In case of such breakdown, the spreads processing line usually cannot be stopped immediately, as such may lead to clogging of lines, pumps and mixers, or products which are excessively worked due to continued stay in shear equipment which may lead to build up of heat and/or deterioration of the structure. For this reason, easy re-working of manufactured product which cannot immediately be packed is desired, as otherwise it may lead to high volumes of waste material. Reworking in a votator line is comparatively easy as the composition in the mixing tank feeding the first scarped surface heat exchanger has the same net composition as the finished product. The finished product just needs to be heated up to melt and it can be added to the first mixing tank. An example is set out in U.S. Pat. No. 6,322,843. Reworking for the ScMM process has been described in WO 2015/052026.

A further alternative for making spreads is known e.g. from GB1327511. This reference discloses a process for the preparation of low-calorie spreads by mixing a first liquid (which is at a temperature of at least 28° C.) which consists of a fat phase containing crystallisable material with a second liquid (which is at a temperature of at most 8° C.) which is substantially free from crystallisable material. At least part of the second liquid is composed of the aqueous phase, and may further contain oils which are liquid at 2° C. The two liquids are fed separately to a high pressure dosing pump, allowing continuous dosing of both liquids to an emulsifying apparatus and subsequently fed to a working unit.

U.S. Pat. No. 3,472,661 discloses a process for preparing liquid margarines, by a process in which a liquid vegetable oil is blended with a thickening agent (a high melting fat), an emulsifier and a phosphatide, and chilling the blend to a point at which it partially crystallises, followed by holding for at least five hours and then vigorously agitating the blend to obtain a uniform dispersion of the fat crystals. The aqueous phase is then added to the fat phase.

There is a desire for a process that allows the manufacture of fat-continuous emulsions comprising edible oil and hardstock (or structuring fat), and which process does not require heating up and cooling of the entire formulation (for reasons of energy consumption) as is required for making such with the known votator process, and which process does not need complex equipment such as is e.g. needed for making the fat powder using the PGSS process, yet which allows for reworking of manufactured product.

SUMMARY OF THE INVENTION

It was found that these objectives can be met, at least in part, by a process for preparing a fat-continuous emulsion, which emulsion comprises 15-83% of an aqueous phase and 17-85% of a fat phase, said fat phase comprising 10-100% hardstock fat (weight % on total fat phase), and 0-90%% oil (weight % on total fat phase), which process comprises the steps of:

a. providing a water-continuous dispersion at a temperature of between 0° C. and 15° C. comprising part of the aqueous phase as the continuous phase with dispersed therein part of the oil;
b. providing part of hardstock fat in melted form and at a temperature of between 30° C. and 60° C.;
c. providing a fat-continuous dispersion which comprises the remainder of the aqueous phase, the remainder of the oil, and the remainder of the hardstock, which dispersion comprises fat crystals in an amount of from 0.2 to 10% by weight, based on the total dispersion provided by this step c.;
d. combining the water-continuous dispersion of step a. with the melted hardstock fat of step b. and the fat-continuous dispersion of step c, wherein the weight ratio of water-continuous dispersion+melted hardstock: fat-continuous dispersion is from 100:1 to 5:1;
e. subjecting the mixture obtained after step d. to a high shear device to provide a fat-continuous emulsion;
wherein the temperature of the mixture obtained from step d. is below the melting point of the hardstock fat.

DETAILED DESCRIPTION OF THE INVENTION

"Hardstock" ("hardstock" and "hardstock fat" and "hardstock phase" herein have the same meaning) is herein to be understood to be an edible fat that is solid at ambient temperature as understood by the person skilled in the art.

It was surprisingly found that by the process of the present invention, that if the dispersion obtained from step c. and combined in step d. with the streams of step a. and step b. contained a minimum of fat crystals (or fat in crystallised form) an improved product quality could be obtained, when compared to a process in which the dispersion in step c. (when added in step d. to the streams of step a. and b.). The improvement in product quality can be e.g. in smaller water droplet size of the final product, or a better stability (sometimes even after temperature cycling). Following this, the dispersion obtained by the process step c., prior to combining with the other components in step d., should contain fat crystals in an amount of at least 0.2% by weight, based on the total dispersion provided by this step c. More fat crystals being present can be desirable, but a very high amount could lead to practical limitations, in the sense that the dispersion will be more difficult to handle, e.g. more difficult to pump. Thus, the dispersion obtained by the process step c., prior to combining with the other components in step d., should contain fat crystals. Preferably, the dispersion in step c. (prior to step d) comprises fat crystals in an amount of from 0.2 to 10% by weight, based on the total dispersion provided by this step c. More preferably, the dispersion in step c. (prior to step d) comprises fat crystals in an amount of from 0.4 to 7% by weight, based on the total dispersion provided by this step c.

The amount of the fat crystals in the dispersion of step c. as above referred to can be controlled e.g. by controlling the temperature of this dispersion, e.g. in a holding tank or in a continuous way by e.g. a heat exchanger. It is preferred in this connection that the fat-continuous dispersion in step d. is at a temperature of between 20 and 50° C. prior to combining with the dispersion of step a. and the hardstock of step b.

The water-continuous dispersion of step a. can be prepared in any suitable manner. It can be prepared both in a continuous and in a batch-like process, and whichever is preferred depends very much on the logistics and available equipment in the factory. Hence, it may be preferred that in the process according to the present invention the water-continuous dispersion of step a. is obtained by mixing continuously in-line an aqueous phase at a temperature of from 0 to 15° C. (more preferably 2-12° C.) with oil at a temperature of from 0 to 25° C. (more preferably 5-20° C.). In the alternative, it may be referred that in the process according to the present invention the water-continuous dispersion of step a. is obtained by providing a stirred tank comprising oil dispersed in the aqueous phase, which stirred tank is held at a temperature of from 0 to 15° C. (more preferably from 2 to 12° C.) for at least 30 minutes, more preferably at least 45 minutes).

The fat-continuous dispersion in step c. can in principle have any amounts of oil, hardstock fat, and aqueous phase, as long as it is a fat-continuous dispersion having the specified level of fat crystals. However, it is preferred that this dispersion in step c. comprises, or even more preferably is, the rework stream of the product obtained after step e, optionally after further mixing, as this is a huge benefit, as it easily and conveniently allows rework of any of the emulsion produced by the process of the invention, e.g. if the packaging line is broken down. For this reason it is preferred that the fat-continuous dispersion in step c. is at a temperature of between 20 and 50° C. prior to combining with the dispersion of step a. and the hardstock of step b in step d. The actual temperature needed to comply with the need for 0.5-5% fat crystals depends e.g. on the types of hardstock fat and oil, the overall composition, but can easily be determined by the skilled person with routine experimentation: trying a few temperatures and measuring the amount of fat crystals to make sure it is within the claimed range.

In order for sufficient hardstock crystals to be formed during or shortly after the high shear mixing operation, it is preferred that the temperature of the water-continuous dispersion in step a. is between 0 and 10° C., more preferably between 2 and 8° C. For the same reason the hardstock fat should be all melted, yet not be at a very high temperature. In this connection, it is preferred that the temperature of the melted hardstock in step b. is between 30 and 45° C., more preferably such temperature is between 32 and 40° C.

As to the amount the water-continuous dispersion of step a. being combined in step d. with the melted hardstock fat of step b. and the fat-continuous dispersion of step c, it is clear that, within reasonable ranges, the more of the dispersion of step c. (with the fat crystals) is added to the streams obtained by step a. and b., in step d, the more the benefits would be obtainable. In other words, a fairly high amount of reworking can be beneficial, in the present invention. However, the rework steram of step c. should not be too high to become unpractical. Hence, in the present invention, the water-continuous dispersion of step a. is preferably combined in step d. with the melted hardstock fat of step b. and the fat-continuous dispersion of step c, such that the weight ratio of water-continuous dispersion+melted hardstock:fat-continuous dispersion is from 40:1 to 10:1.

As to the amount of hardstock to be used, a middle ground should be found between low SAFA (saturated fatty acid) levels, stability, and practical workability. Following this, it is preferred that the weight ratio of water-continuous dispersion+melted hardstock:fat-continuous dispersion in the process is from 40:1 to 10:1. Likewise, the weight ratio of oil:hardstock in the product as made by the process of the present invention is preferably from 1:0.1 to 1:1.

Preferably, for reasons of consumer acceptance and the image of being all natural, the hardstock fat comprises at least 70% (more preferably at least 80%) of triglyceride esters of fatty acids (TAG's), by weight based on the total hardstock fat.

As to step e., the subjecting of the mixture of all ingredients obtained to high shear mixing, this mixing step e. is preferably carried out in a continuous process. In order to achieve the desired phase inversion of the aqueous dispersion into a fat-continuous emulsion with water droplets of the desired size and the formation of small crystals of hardstock that can stabilise such emulsion and that can give sufficient firmness to the product, the mixing of the combination of water-continuous dispersion with melted hardstock and fat-continuous dispersion should go in a swift way, and also the mixing operation should only result in a small temperature increase due to such high shear mixing. Regarding the latter, it is preferred that the high shear device results in a temperature increase of the emulsion of less than 5° C., more preferably a temperature increase of the emulsion of less than 3° C., when comparing temperature of the aqueous dispersion at the inlet and the temperature of the emulsion at the outlet of the high shear device. It was found that a high shear mixer having a rotor and a stator, which mixer has a residence time of less than 3 seconds, and sufficient shear to effect emulsification of water droplets in oil having a droplet size $D_{3,3}$ of less than 15 micrometer, can achieve such objectives. Hence, preferably the high shear device in step e. is such high shear mixer. A typical example of a mixer that can achieve the desired objectives is a fluid division mixer (FDM) as marketed by Maelstrom and as is described e.g. in EP1331988, in WO2002/38263, and in WO2013/037605.

Following the above, in the process according to the present invention, in view of the above considerations, the high shear device in step e. is preferably a high shear mixer having a rotor and a stator, which mixer has a residence time of less than 3 seconds, and sufficient shear to effect emulsification of water droplets in oil having a droplet size $D_{3,3}$ of less than 15 micrometer.

Depending on the product mixture (e.g. presence of protein) it may be desired to subject the mixture that is obtained in step d. from the high shear device to a pin stirrer (in other words: to add a pin-stirrer after the process as set out above). Pin stirrers are also known in margarine processing as C-units. Thus, it may be preferred that subjecting the mixture in step d. to a high shear device is followed by subjecting the mixture to a pin stirrer.

Although the process according to the present invention may yield liquid products or wrapper-type margarines, it is preferred that the fat continuous emulsion made by this process is a spreadable emulsion. A spreadable emulsion is an emulsion of the composition as described herein, which furthermore has a Stevens value of between 30 and 300 gram, when measured at 5° C.

The process according to the present invention may be carried out on compositions with different fat levels. It is preferred, for economic reasons, that the composition comprises 40-80% fat.

In order to manage the final composition of the product, it may be preferred that the overall composition of the fat-continuous dispersion of step c. is the same as the overall composition of the fat-continuous emulsion produced by step e.

EXAMPLES

Methods
Water Droplet Size Distribution of W/O Emulsions

The normal terminology for Nuclear Magnetic Resonance (NMR) is used throughout this method. On the basis of this method the parameters $d_{3,3}$ and $\exp(\sigma)$ of a log normal water droplet size distribution can be determined. The $d_{3,3}$ is the volume weighted mean droplet diameter (in microns, in the present case) and $e^\sigma$ (e-sigma) is the standard deviation of the logarithm of the droplet diameter.

The NMR signal (echo height) of the protons of the water in a water-in-oil emulsion are measured using a sequence of 4 radio frequency pulses in the presence (echo height E) and absence (echo height E*) of two magnetic field gradient pulses as a function of the gradient power. The oil protons are suppressed in the first part of the sequence by a relaxation filter. The ratio (R=E/E*) reflects the extent of restriction of the translational mobility of the water molecules in the water droplets and thereby is a measure of the water droplet size. By a mathematical procedure—which uses the log—normal droplet size distribution—the parameters of the water droplet size distribution $d_{3,3}$ (volume weighed geometric mean diameter) and a (distribution width) are calculated.

A Bruker magnet with a field of 0.47 Tesla (20 MHz proton frequency) with an air gap of 25 mm is used (NMR Spectrometer Bruker Minispec MQ20 Grad, ex Bruker Optik GmbH, DE).

Solids in Rework Stream
The amount of solids in the rework stream in the examples was measured with NMR Examples 1, 2

A spreadable edible emulsion was prepared having the recipe as in Table 1.

TABLE 1

| Component | Amount (wt % on total) | Phase |
|---|---|---|
| Palm oil | 31 | Hardstock phase |
| Rapeseed oil | 22.8 | Emulsion phase |
| PO58 | 5 | Hardstock phase |
| MonoGlyceride (Emulsifier) | 0.6 | Hardstock phase |
| Lecithine | 0.1 | Hardstock phase |
| b-carotene (30% solution) | 0.138 | Emulsion phase |
| Demi-water | 38 | Emulsion phase |
| Salt | 1.6 | Emulsion phase |
| Potassium sorbate | 015 | Emulsion phase |
| skimmed milk powder | 0.5 | Emulsion phase |
| NaCaEDTA | 0.0058 | Emulsion phase |
| Lecithine | 0.1 | Emulsion phase |

The composition was made by first preparing the emulsion phase in a premix vessel. The emulsion phase so-prepared was kept at 6° C.

The hardstock phase was made by mixing all ingredients for this phase in a second premix vessel.

The emulsion phase was then mixed in-line with the hardstock phase and subsequently in-line with the rework phase in a ratio of 33:57:10.

The hardstock phase temperature at the point of mixing was 44° C., the waterphase at 6° C. The rework phase had the same composition as the combined emulsion and hardstock phase. The temperature of the rework phase was 40° C. (example 1) and 50° C. (example 2).

The combined stream was fed to a high shear mixer (operating at 2800 rpm). This mixer was of the type FDM or fluid division mixer by Maelstrom, similar as in WO 02/38263, with a concentric rotor-stator system with 4 rows of cavities in both rotor and stator, with a total volume of 0.083 liter. The cavities in the rotor and stator of the FDM, were spherical segments which are open on both vertical and horizontal faces. The rotor and stator are based on a stepped conical form so that the diameter of the cone increases from inlet to outlet (about 50 up to 150 mm). The mixer is commercially available from Maelstrom (http://www.maelstrom-apt.com/product-dc50/). This high shear operation by the FDM was followed by subjecting the so-obtained composition to a 3 liter pin-stirrer (or C-unit) operating at 100 rpm. The resulting product coming out of the pin stirrer had the appearance of a spread.

Comparative Example A

A second spreadable edible emulsion was prepared having the same recipe as Example 1. The emulsion was made with the same process, only with a difference in rework temperature. The rework temperature was 60° C. At this temperature there was no crystallised fat present in the rework stream.

Example 3 and Comparative Example B

A spreadable edible emulsion was prepared having the recipe as in Table 2.

TABLE 2

| Component | Amount (wt % on total) | Phase |
|---|---|---|
| Water | 77.44 | Water phase |
| Salt | 2.5 | Water phase |
| Minors (Potassium Sorbate, EDTA, vitamins) | 0.06 | Water phase |
| Rbd palm olein fractionate (single stage dry fractionated palm oleine with Iodine Value of 56) | 7.6 | Oil phase |
| Rbd palm oil | 11.3 | Oil phase |
| Mono and diglycerides (Dimodan-UJ ex Grindstedt, Denmark; distilled 90% unsaturated monoglyceride of Sunflower Oil) | 0.28 | Oil phase |
| PGPR (polyglycerol polyricinoleate, PGPR90 ex Grindstedt, Denmark) | 0.38 | Oil phase |
| Rape 70 (hardened rapeseed oil with a mp of 70° C.) | 0.43 | Oil phase |
| Flavor, colour & vitamins | 0.01 | Oil phase |

The composition was made by first preparing the aqueous phase in a premix vessel. The aqueous phase so-prepared was kept at 50° C. and cooled inline via a Tubular Heat Exchanger (THE) down to 19° C., before it was mixed in-line with the oil phase. The oil phase was made by mixing all ingredients for this phase in a premix vessel. The aqueous phase was then mixed in-line with the oil phase. The temperature of the oil phase, at the point of mixing, was 45° C. In example 3 the rework phase was mixed in as well in-line just after this point. The oil phase, water phase and rework phase were mixed resp. in the ratio 19:76:5. In case of the comparative example B, where no rework was applied, the ratio was resp. 20:80:0. The rework phase had the same composition as the combined emulsion and oil phase. The temperature of the rework phase was 41° C. This was fed to a high shear mixer (operating at 2800 rpm). This mixer was of the type FDM, or fluid division mixer by Maelstrom, similar as in WO 02/38263, with a concentric rotor-stator system with 4 rows of cavities in both rotor and stator, with a total volume of 0.083 liter. The cavities in the rotor and stator were spherical segments which are open on both vertical and horizontal faces. The rotor and stator are based on a stepped conical form so that the diameter of the cone increases from inlet to outlet (about 50 up to 150 mm). The mixer is commercially available from Maelstrom (http://www.maelstrom-apt.com/product-dc50/). The resulting product coming out of the high shear mixer had the appearance of a spread.

Results

TABLE 3

| | Example 1 | Example 2 | Comparative Example A |
|---|---|---|---|
| Rework temperature | 40° C. | 50° C. | 60° C. |
| % of solids in the rework stream | 5.2% | 2.0% | 0% |
| Rework level | 10% | 10% | 10% |
| $d_{3,3}$ ambient | 8.6 | 6.5 | 15.3 |
| $d_{3,3}$ cycle | 17.8 | 9.8 | Free water |

Herein, $d_{3,3}$ ambient is droplet size (micron) measured after 2 days keeping the products at ambient temperatures of about 20° C.

And $d_{3,3}$ cycle is droplet size (micron) measured after keeping the products for 3 days at 40° C., followed by stabilizing at 20° C. and measurement at 20° C.

All products with $d_{3,3}$ below in table 4 at ambient conditions and which are stable upon temperature cycling are having acceptable quality.

TABLE 4

| | Comparative Example B | Example 3 |
|---|---|---|
| Rework temperature | — | 41° C. |
| % of solids in the rework stream | — | 5.2% |
| Rework level | 0% | 5% |
| $d_{3,3}$ ambient | 2.7 | 2.8 |

Comparative example B and example 3 show that with and without rework good products with this set up can be made, and example 1,2 and comparative A show that if rework is applied, better products are obtained if the rework stream contains some crystallised fat.

The invention claimed is:

1. A process for preparing a fat-continuous emulsion, which emulsion comprises 15-83% of an aqueous phase and 17-85% of a fat phase, said fat phase comprising 10-100% hardstock fat (weight % on total fat phase), and 0-90% oil (weight % on total fat phase), which process comprises the steps of:

a) providing a water-continuous dispersion at a temperature of between 0° C. and 15° C. comprising part of the aqueous phase as the continuous phase with dispersed therein part of the oil;
b) providing part of hardstock fat in melted form and at a temperature of between 30° C. and 60° C.;
c) providing a fat-continuous dispersion which comprises the remainder of the aqueous phase, the remainder of the oil, and the remainder of the hardstock, which dispersion comprises fat crystals in an amount of from 0.2 to 10% by weight, based on the total dispersion provided by this step c);
d) combining the water-continuous dispersion of step a) with the melted hardstock fat of step b) and the fat-continuous dispersion of step c), wherein the weight ratio of water-continuous dispersion+melted hardstock: fat-continuous dispersion is from 100:1 to 5:1; and
e) subjecting the mixture obtained after step d) to a high shear device to provide a fat-continuous emulsion;
wherein the temperature of the mixture obtained from step d) is below the melting point of the hardstock fat;
wherein the dispersion in step c) comprises a rework stream of the product produced by step e), and wherein the high shear device is a high shear mixing process in a high shear mixer having a rotor and a stator, which mixer has a residence time of less than 3 seconds, and sufficient shear to effect emulsification of water droplets in oil having a droplet size D3.3 of less than 15 micrometers; and
wherein the high shear device results in a temperature increase of the emulsion of less than 5° C., when comparing temperature of the aqueous dispersion at the inlet and the temperature of the emulsion at the outlet of the high shear device.

2. The process according to claim 1, wherein the water-continuous dispersion of step a) is obtained by mixing continuously in-line an aqueous phase at a temperature of from 0 to 15° C. with oil at a temperature of from 0 to 25° C.

3. The process according to claim 1, wherein the dispersion of step a) is obtained by providing a stirred tank comprising oil dispersed in the aqueous phase, which stirred tank is held at a temperature of from 0 to 15° C. for at least 30 minutes.

4. The process according to claim 1, wherein the fat-continuous dispersion in step c) is at a temperature of between 20 and 50° C. prior to combining with the dispersion of step a) and the hardstock of step b) in step d).

5. The process according to claim 1, wherein the temperature of the water-continuous dispersion in step a) is between 0 and 10° C.

6. The process according to claim 1, wherein the temperature of the melted hardstock in step b) is between 30 and 45° C.

7. The process according to claim 1, wherein the water-continuous dispersion of step a) is combined in step d) with the melted hardstock fat of step b) and the fat-continuous dispersion of step c), in a weight ratio of water-continuous dispersion+melted hardstock:fat-continuous dispersion is from 40:1 to 10:1.

8. The process according to claim 1, wherein step e) is carried out in a continuous process.

9. The process according to claim 1, wherein subjecting the mixture in step e) to a high shear device is followed by subjecting the mixture to a pin stirrer.

10. The process according to claim 1, wherein the fat continuous emulsion is a spreadable emulsion.

11. The process according to claim 1, wherein the emulsion comprises 40-80% fat.

12. The process according to claim 1, wherein the overall composition of the fat-continuous dispersion of step c) is the same as the overall composition of the fat-continuous emulsion produced by step e).

13. The process according to claim 1, wherein the dispersion in step c) comprises fat crystals in an amount of from 0.4 to 7% by weight, based on the total dispersion provided by step c).

14. The process according to claim 1, wherein the dispersion in step c) comprises fat crystals in an amount of from 0.5 to 5% by weight, based on the total dispersion provided by step c).

15. A process for preparing a fat-continuous emulsion, which emulsion comprises 15-83% of an aqueous phase and 17-85% of a fat phase, said fat phase comprising 10-100% hardstock fat (weight % on total fat phase), and 0-90% oil (weight % on total fat phase), which process comprises the steps of:
a) providing a water-continuous dispersion at a temperature of between 0° C. and 15° C. comprising part of the aqueous phase as the continuous phase with dispersed therein part of the oil;
b) providing part of hardstock fat in melted form and at a temperature of between 30° C. and 60° C.;
c) providing a fat-continuous dispersion which comprises the remainder of the aqueous phase, the remainder of the oil, and the remainder of the hardstock, which dispersion comprises fat crystals in an amount of from 0.2 to 10% by weight, based on the total dispersion provided by this step c);
d) combining the water-continuous dispersion of step a) with the melted hardstock fat of step b) and the fat-continuous dispersion of step c), wherein the weight ratio of water-continuous dispersion+melted hardstock: fat-continuous dispersion is from 100:1 to 5:1; and
e) subjecting the mixture obtained after step d) to a high shear device to provide a fat-continuous emulsion;
wherein the temperature of the mixture obtained from step d) is below the melting point of the hardstock fat;
wherein the dispersion in step c) comprises a rework stream of the product produced by step e), and wherein the high shear device is a high shear mixing process in a high shear mixer having a rotor and a stator, which mixer has a residence time of less than 3 seconds, and sufficient shear to effect emulsification of water droplets in oil having a droplet size D3.3 of less than 15 micrometers; and
wherein the fat-continuous dispersion of step c) comprises at least a portion of the fat-continuous spread produced in step e).

* * * * *